Figure 1:
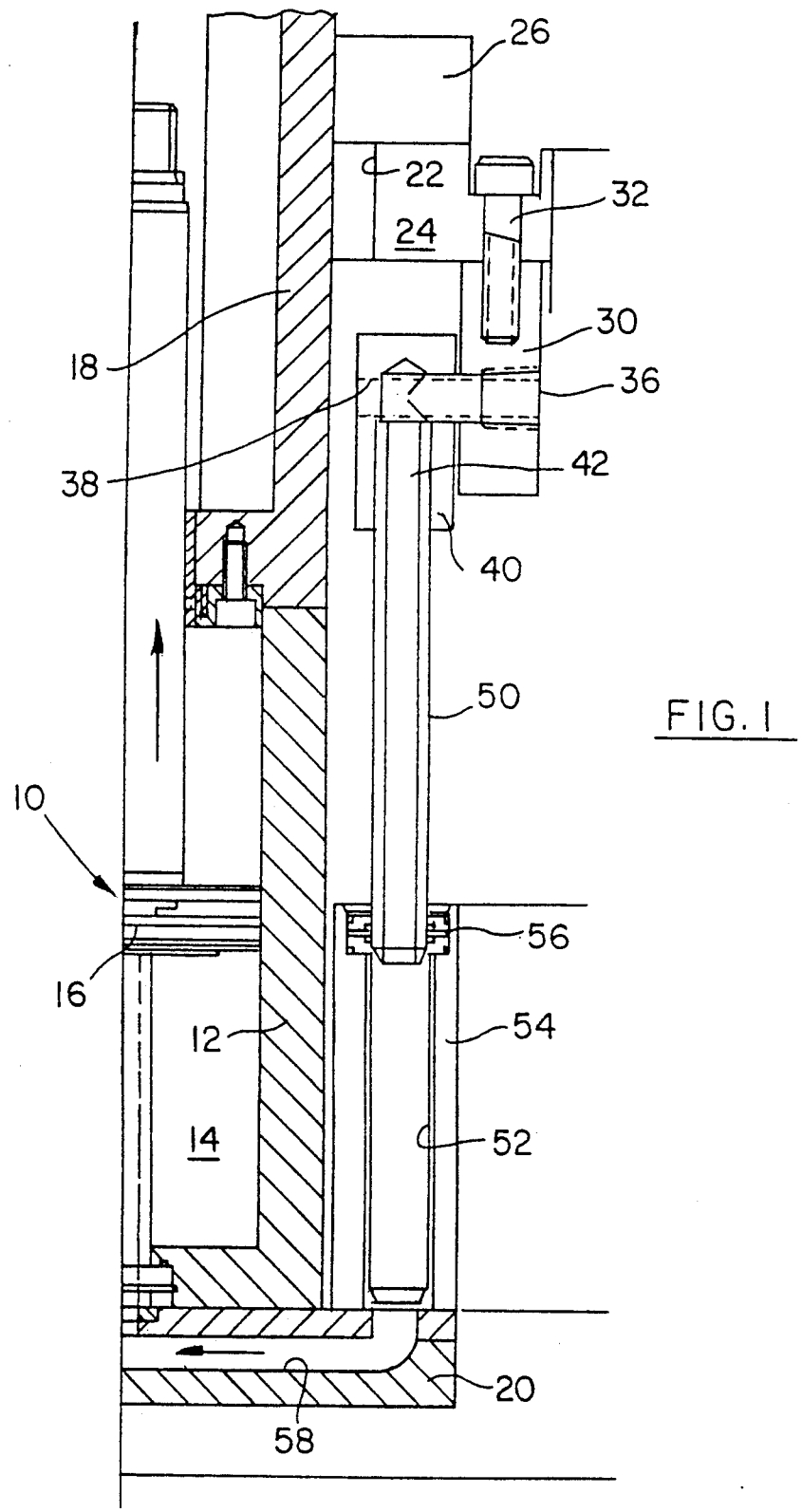

United States Patent [19]

Trahan et al.

[11] Patent Number: 5,028,249
[45] Date of Patent: Jul. 2, 1991

[54] PLUNGER MECHANISM FOR I.S. MACHINE

[75] Inventors: Albert Trahan, Tolland, Conn.; Vladimir Vajda, Nussbaumen, Switzerland

[73] Assignee: Emhart Industries, Inc., Towson, Md.

[21] Appl. No.: 624,611

[22] Filed: Dec. 10, 1990

[51] Int. Cl.$^5$ .............................................. C03B 11/12
[52] U.S. Cl. ......................................... 65/172; 65/319
[58] Field of Search ................. 65/172, 173, 362, 356, 65/319, 322, 323, 355

[56] References Cited

U.S. PATENT DOCUMENTS 3,598,561 10/1971 Hamilton ............................... 65/322
4,659,357 4/1987 Doud .................................... 65/319

Primary Examiner—Richard V. Fisher
Assistant Examiner—John Hoffmann
Attorney, Agent, or Firm—Spencer T. Smith

[57] ABSTRACT

The air lines for a plunger mechanism are permanently secured to a mainfold which is secured to the bottom of the section frame. To complete the air delivery system removable upper manifold having downwardly extending air tubes in interconnected with a lower manifold having elongated upwardly extending air passages. The upper removable manifold is releasable secured to the fixed upper manifold and the lower manifold is secured to the base plate which supports the plunger mechanism by a tool which extends through holes in the quik plate, section frame and removable upper manifold.

3 Claims, 2 Drawing Sheets

PLUNGER MECHANISM FOR I.S. MACHINE

The present invention relates to I.S. machines which form a gob of molten glass into a glass container such as a bottle and more particularly to the plunger mechanism assemblies used in such machines.

A plunger mechanism assembly includes a plunger mechanism which has at least one chamber in which a piston can be displaced to move a plunger secured thereto and a base plate on which the plunger mechanism is secured. Air piping in the form of flexible hoses is connected to conventional fittings which are located on the top surface of the base plate. These connections are difficult to access and time consuming to make and the hoses occupy space in the section box where air is flowing interferring with such flow.

It is accordingly an object of the present invention to provide a plunger mechanism assembly which can be quickly connected to the required air lines and so that the air lines can be located out of the space where air is flowing through the section box.

Other objects and advantages of the present invention will become apparent from the following portion of this specification and from the accompanying drawings which illustrates in accordance with the mandate of the patent statutes a presently preferred embodiment incorporating the principles of the invention.

Figure 2:
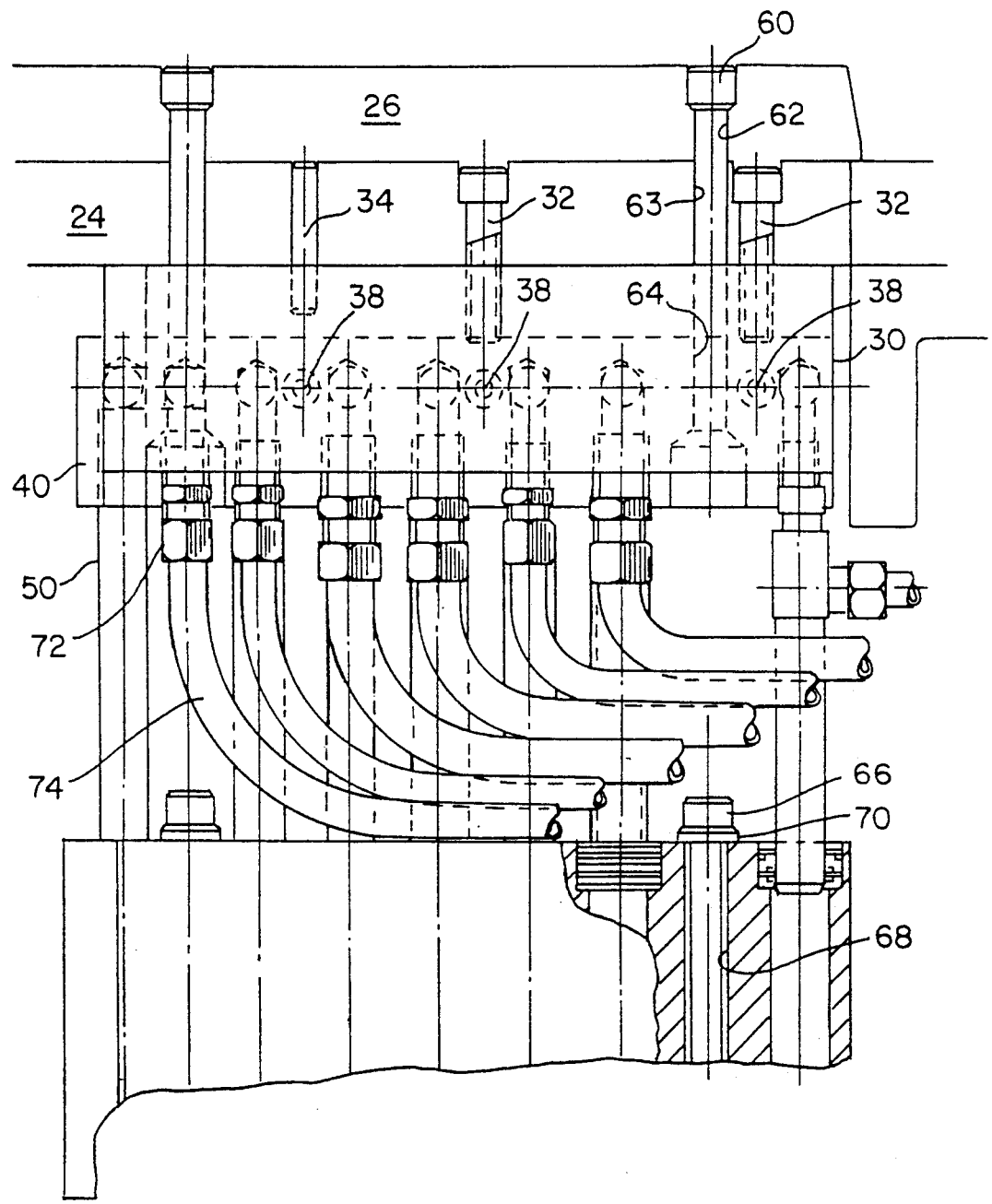

Referring to the drawings:

FIG. 1 is an elevational cross-sectional front view of a portion of a plunger mechanism assembly; and FIG. 2 is a side view, partly in section of a portion of the plunger mechanism assembly shown in FIG. 1.

A plunger mechanism assembly for an individual section of an I.S. machine includes a Plunger mechanism 10 having a lower cylinder portion 12 with at least one chamber 14 in which a piston 16 can be displaced to advance a plunger (not shown) attached to the piston. The plunger mechanism also has an upper casing 18 which contains positioning and guiding means (not shown). The assembly also has a base plate 20 which supports the plunger mechanism. The plunger mechanism is located within an enlarged opening 22 in the section frame 24 and is held in position by a guide plate 26.

Air under pressure must be supplied to the assembly to operate the piston and to cool the plunger, for example. A fixed manifold 30 is secured by screws 32 and pins 34 to the bottom surface of the section frame 24 and includes a number of threaded air ports 36. Releasably secured to the fixed manifold 30 by screws 38 is a removable manifold 40 which includes a corresponding number of air conduits 42 which communicate with associated fixed manifold air ports 36. An elongated tube 50 extends vertically downwardly from each air conduit 42 of the removable manifold 40. The tube 50 is received within a corresponding vertical throughbore 52 in a lower manifold 54 and is sealed by a suitable seal 56. The length of the tube is selected so that the seal will maintain this conduit as the base plate 20 position is changed relative to the section frame 24. In FIG. 1, this through bore 52 communicates with a passage 58 in the base plate which will supply cooling air to the plunger.

To connect this air manifold system, the fixed upper manifold 30 is first secured to the section frame 24. The removable upper manifold 40 and the lower manifold 54 are interconnected by inserting the tubes 50 into the throughbores 52 and the lower manifold is placed loosely on the top of the base plate 20. The removable upper manifold 40 is then raised and releasably secured to the fixed upper manifold 30 with screws 38. The plunger mechanism 10 is then inserted into the frame 24 through the opening 22. The plunger mechanism is aligned causing slight movement of the base plate and the guide plate 26 is secured to the frame to permanently maintain this alignment.

Plugs 60 are removed from through holes 62 in the guide plate 26 and a wrench is extended through this hole and through holes 63, 64 in the frame 24 and removable upper manifold 40 to reach screws 66 which are tightened into threaded holes in the base plate 20. The hole 68 in the lower manifold is substantially larger then the screw 66 and the screw 66 sets on a large washer 70 so that wherever the base plate is finally located (within its location range) the screw 66 can find this hole 68. Each air passage through hole 52 in the lower manifold is also substantially larger than its associated base plate conduit 58 so that there will always be full communication therebetween. Air fittings 72 at the end of air lines 74 will then be connected to the fixed upper manifold which is easily accessible. The baseplate which contains a number of seals which can wear can accordingly be serviced without disconnecting these air connections 72, 74.

We claim:

1. An individual section of an I.S. machine comprising
   a plunger mechanism,
   a base plate for supporting said plunger mechanism,
   a section frame having a hole through which said plunger mechanism extends and having top and bottom surfaces
   a guide plate located on the top surface of said section frame and matingly engaging the outer periphery of said plunger mechanism,
   an upper fixed manifold secured to the bottom surface of said section frame, said fixed manifold including a plurality of air conduits,
   an upper removable manifold releasably secured to said fixed manifold, said removable manifold including a corresponding number of passage means each including an elongated tube, and
   a lower manifold connected to said base plate and including a corresponding number of elongated air passage means for receiving said corresponding number of tubes and means for sealing said tubes within said elongated air passage means.

2. An individual section according to claim 1, further comprising screw means for securing said lower manifold to said base plate and wherein said guide plate, section frame and removable upper manifold have aligned through holes therein so that a wrench can extend therethrough to operate on said screw means.

3. An individual section according to claim 1, further comprising air fitting means including air piping connected to each of said plurality of upper fixed manifold air conduits

* * * * *